United States Patent [19]
Bracnik et al.

[11] Patent Number: 4,632,331
[45] Date of Patent: Dec. 30, 1986

[54] RETRACTOR ASSEMBLY

[75] Inventors: Anthony S. Bracnik, Penetanguishene; Keith D. Charlton, Midland, both of Canada

[73] Assignee: TRW Canada Limited, Toronto, Canada

[21] Appl. No.: 767,483

[22] Filed: Aug. 19, 1985

[51] Int. Cl.$^4$ .................. B60R 22/40; B65H 75/48
[52] U.S. Cl. ............................................ 242/107.4 A
[58] Field of Search ............... 242/107.4 A; 297/478; 280/806

[56] References Cited

U.S. PATENT DOCUMENTS

| | | | |
|---|---|---|---|
| 3,834,646 | 9/1974 | Heath | 242/107.4 A X |
| 4,058,271 | 11/1977 | Ubukata | 242/107.4 A X |
| 4,101,094 | 7/1978 | Wallin | 242/107.4 A |
| 4,475,697 | 10/1984 | Wyder | 242/107.4 A |
| 4,483,495 | 11/1984 | Mönl | 242/107.4 A |

*Primary Examiner*—Stuart S. Levy
*Assistant Examiner*—Katherine Matecki
*Attorney, Agent, or Firm*—Yount & Tarolli

[57] ABSTRACT

An improved seat belt retractor has a rotatable reel around which a safety belt may be wound. A locking pawl is movable between a disengaged condition and an engaged condition engaging ratchet wheel teeth on the reel to hold the reel against rotation. To move the locking pawl into engagement with the ratchet wheel teeth, a pilot pawl is moved from a disengaged condition toward an engaged condition. As the pilot pawl moves toward the engaged condition, it engages a pilot pawl gear and moves the locking pawl toward its engaged condition. A releasable connector assembly or clutch is connected with the ratchet wheel and pilot pawl gear to allow relative rotation to occur between them after movement of the pilot pawl to the engaged condition. The relative rotation results in a change in the angular relationship between the teeth on the ratchet wheel and the teeth on the pilot pawl gear. In order to have a consistently repeatable locking action, the connector assembly re-establishes the initial angular relationship between the teeth on the ratchet wheel and the teeth on the pilot pawl gear.

10 Claims, 7 Drawing Figures

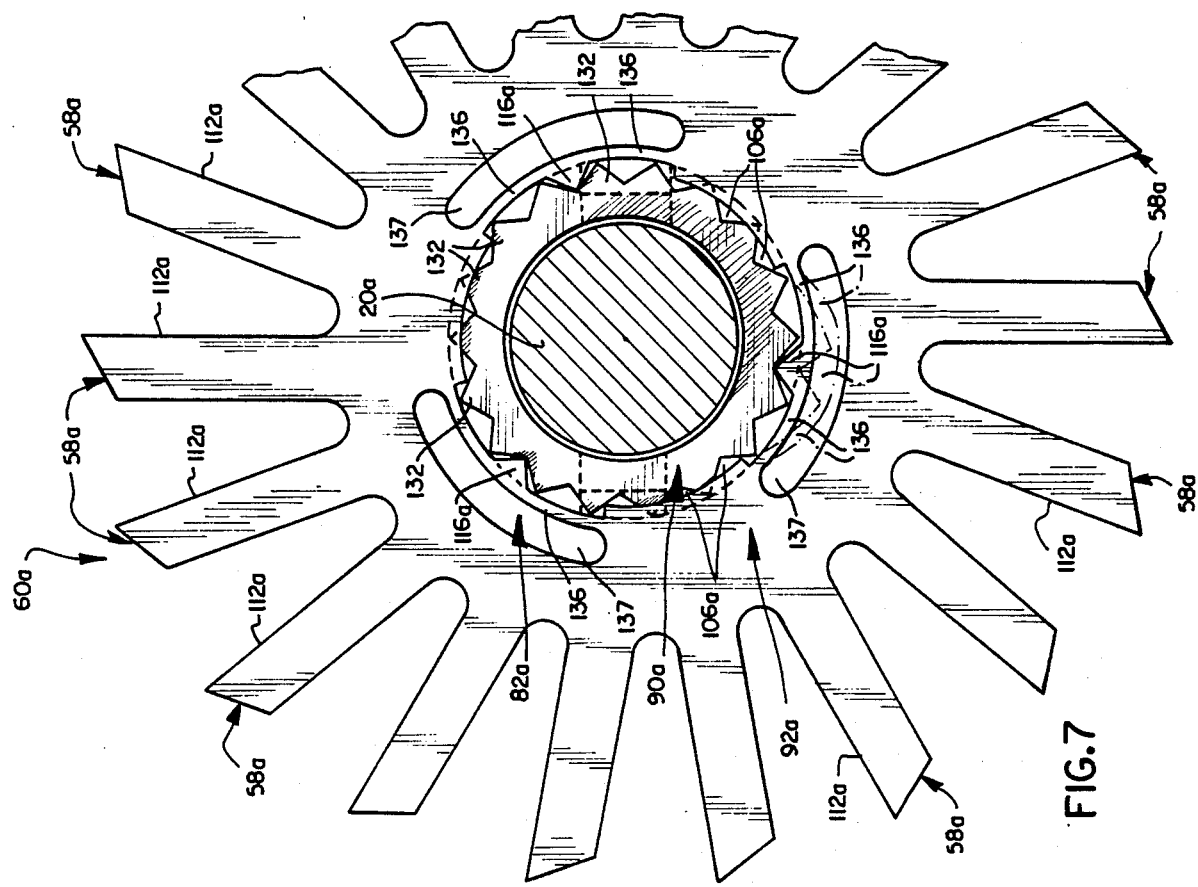
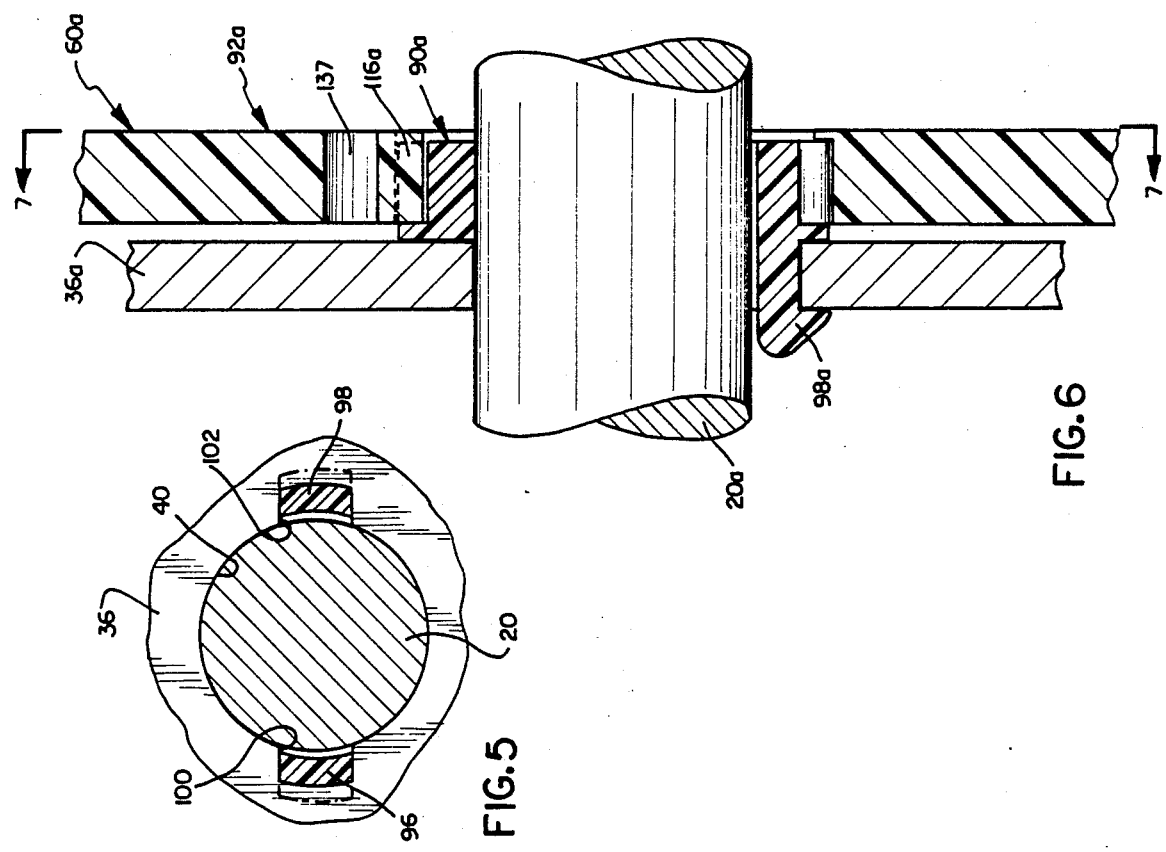

RETRACTOR ASSEMBLY

BACKGROUND OF THE INVENTION

The present invention relates to a new and improved seat belt retractor.

Seat belt retractors store a seat belt when it is not buckled around an occupant of a vehicle. Upon the occurrence of an emergency situation while the seat belt is buckled around an occupant of a vehicle, the retractor locks the seat belt against withdrawal to restrain movement of the occupant. Known seat belt retractors include a reel around which the belt is wound. To restrain an occupant of a vehicle in an emergency situation, a locking pawl or bar is moved into engagement with ratchet wheel teeth on the reel to block rotation of the reel in an unwinding direction.

Some seat belt retractors have a pilot pawl system for moving the locking pawl into engagement with the ratchet wheel teeth. U.S. Pat. Nos. 3,834,646 and 4,475,697 disclose seat belt retractors in which a locking a pawl is moved into engagement with a ratchet wheel by a pilot pawl system. The pilot pawl system includes an inertia weight which moves a pilot pawl into engagement with a rotating pilot pawl gear upon the occurrence of excessive vehicle deceleration. The rotating pilot pawl gear continues the movement of the pilot pawl which, in turn, moves the locking pawl into engagement with the ratchet wheel. The amount of the pilot pawl gear rotation which occurs to effect movement of the locking pawl into engagement with the ratchet wheel depends upon the angular position of the teeth of the pilot pawl gear relative to the teeth of the ratchet wheel.

U.S. Pat. No. 4,101,094 discloses a pilot pawl system in which there is a clutch between the pilot pawl gear and ratchet wheel to enable the ratchet wheel to rotate relative to the pilot pawl gear. Thus, if the locking pawl does not engage the ratchet teeth, the ratchet teeth rotate relative to the pilot pawl gear and excessive forces are not applied to the pilot pawl gear or pilot pawl which might cause breaking thereof. Since relative rotation occurs between the ratchet wheel and pilot pawl gear, the angular orientation between the teeth on the pilot pawl gear and the ratchet wheel will be changed. The changed angular orientation between the teeth on the pilot pawl gear and ratchet wheel results in a different locking action being obtained the next time the retractor is actuated. Specifically, the amount of belt withdrawal will change.

SUMMARY OF THE PRESENT INVENTION

The present invention provides a seat belt retractor having a consistent locking action. The retractor includes a locking pawl which is moved into engagement with teeth on a ratchet wheel by a pilot pawl upon engagement of the pilot pawl with a pilot pawl gear. A releasable connector assembly or clutch allows relative rotation to occur between the ratchet wheel and pilot pawl gear to prevent excessive loads from being applied to the pilot pawl or pilot pawl gear. This results in a corresponding change in the angular relationship between the teeth on the ratchet wheel and the teeth on the pilot pawl gear. In order to provide a consistent locking action upon repeated actuation of the retractor, the connector assembly of the present invention re-establishes a predetermined angular relationship between the teeth on the ratchet wheel and the teeth on the pilot pawl gear after the predetermined angular relationship is lost because of rotation of the ratchet wheel relative to the pilot pawl gear.

Accordingly, it is an object of this invention to provide a new and improved seat belt retractor having a locking pawl which is movable to engage teeth on a ratchet wheel and a pilot pawl which is movable into engagement with teeth on a pilot pawl gear and wherein a connector assembly allows relative movement to occur between the ratchet wheel and pilot pawl gear and is operable to re-establish a predetermined angular relationship between the teeth on the ratchet wheel and the teeth on the pilot pawl gear after relative rotation thereof.

BRIEF DESCRIPTION OF THE DRAWINGS

The foregoing and other objects and features of the present invention will become apparent to one skilled in the art upon consideration of the following description of preferred embodiments of the present invention taken in connection with the accompanying drawings wherein:

FIG. 5 is a fragmentary view, taken along the line 5—5 of FIG. 3, illustrating the manner in which the pilot pawl gear is connected with the ratchet wheel;

FIG. 6 is a fragmentary sectional view, similar to FIG. 3, illustrating the relationship between a second embodiment of the pilot pawl gear and the ratchet wheel; and FIG. 7 is a sectional view, taken along the line 7—7 of FIG. 6, further illustrating the construction of the pilot pawl gear of the embodiment of FIG. 6.

DESCRIPTION OF SPECIFIC PREFERRED EMBODIMENTS OF THE INVENTION

General Description

A seat belt retractor 10 (FIG. 1) stores a seat belt when it is not buckled around an occupant of a vehicle. When the seat belt is buckled around an occupant, the retractor locks the belt against extension to restrain the occupant when an emergency situation occurs, such as excessive vehicle deceleration. The retractor 10 includes a housing 12 which encloses components of the retractor and protects them against dirt and foreign particles. A frame 14 which is connectable with the vehicle is enclosed by the housing 12. A belt reel 16 is rotatably mounted on the frame 14 and is connected with one end portion of a seat belt (not shown).

Figure 1:
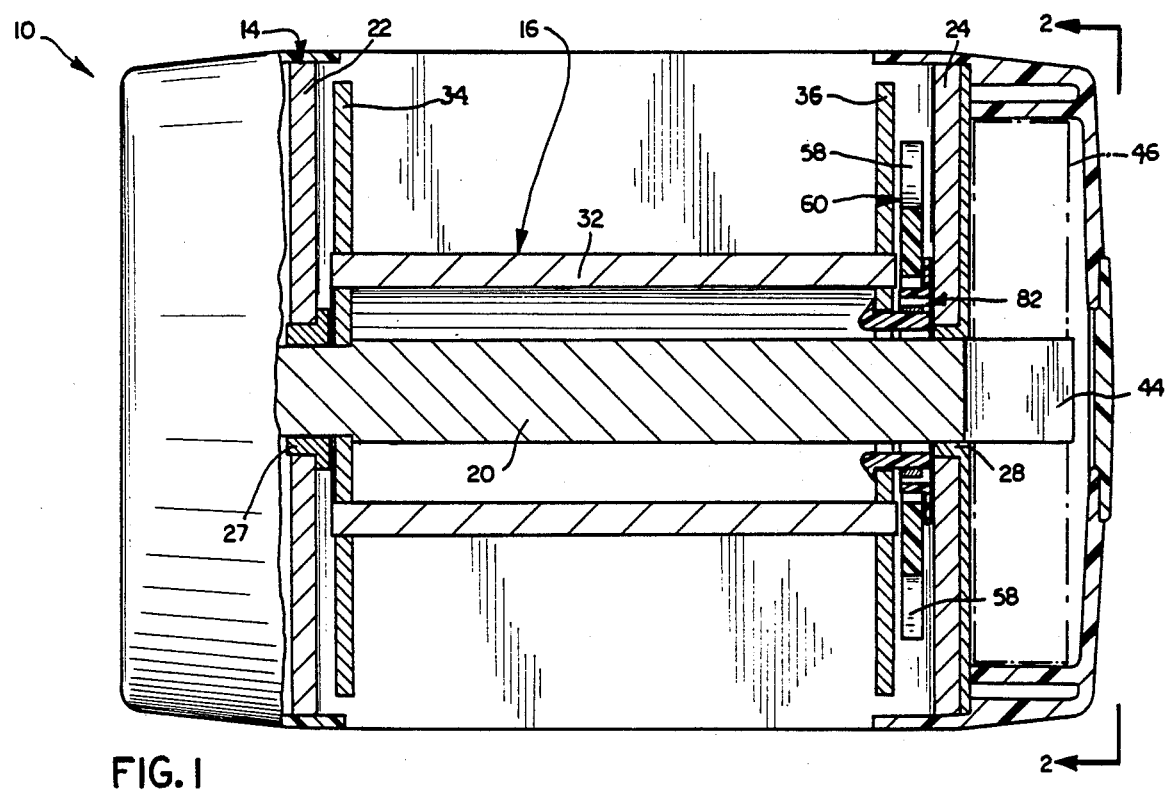
FIG. 1 is a sectional view of a seat belt retractor constructed in accordance with the present invention.

The reel 16 includes a cylindrical central shaft 20 which is rotatably supported by opposite side sections 22 and 24 of the frame 14 by bearings 27 and 28. A rotatable hub or element 32 of the reel is coaxial with the shaft 20 and is fixedly connected with circular ratchet wheels 34 and 36 at axially opposite ends of the reel 16. The left (as viewed in FIG. 1) ratchet wheel 34 is held against rotation relative to the shaft 20 by a flat or key formed in the shaft. Although the shaft 20 extends through a circular opening 40 in the ratchet wheel 36 (FIG. 5), the ratchet wheel 36 is held against rotation relative to the shaft 20 by the cylindrical hub 32 which is fixedly connected with both the left and right ratchet wheels 34 and 36 (FIG. 1).

The right (as viewed in FIG. 1) end portion 44 of the shaft 20 is connected with a spiral spring 46 which urges the reel 16 to rotate in a direction to wind up the belt on the reel 16. The opposite or left end portion of the shaft 20 is connected with a comfort mechanism (not shown) which prevents the seat belt from being pulled against an occupant of the vehicle under the influence of the biasing spring 46 when the seat belt is in use.

Figure 2:
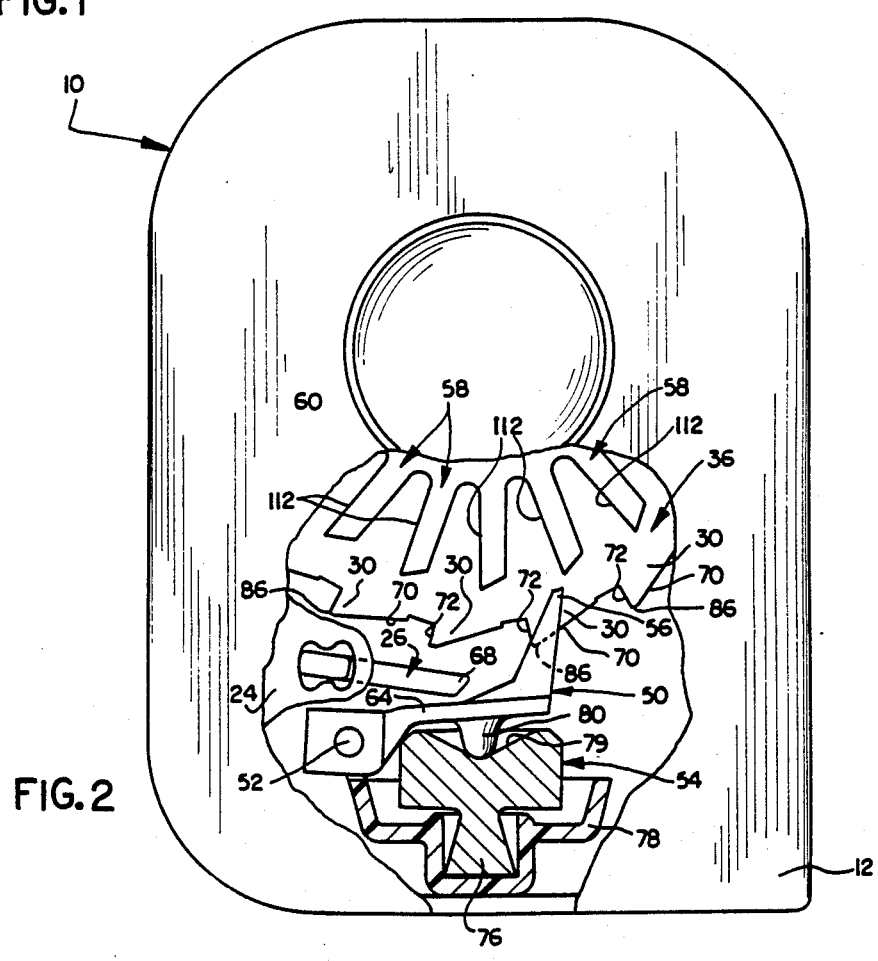
FIG. 2 is a partially broken away end view, taken generally along the line 2—2 of FIG. 1, illustrating the relationship between a locking pawl and ratchet wheel and a pilot pawl and pilot pawl gear of the retractor.

In an emergency, the reel 16 is locked against rotation in a belt unwinding direction by engagement of a locking pawl 26 (FIG. 2) with annular arrays of teeth 30 on the ratchet wheels 34 and 36. Although only the teeth 30 on the ratchet wheel 36 are shown in FIG. 2, it should be understood that the ratchet wheel 34 has teeth with the same configuration as the teeth 30. The hub 32 interconnects the ratchet wheels 34 and 36 with the teeth 30 on the ratchet wheels in axial alignment with each other so that the locking pawl 26 can simultaneously engage the teeth 30 on both ratchet wheels.

The locking pawl 26 is pivotally mounted on the sections 22 and 24 of the frame 14. The locking pawl 26 is shown in FIG. 2 in a disengaged condition in which the locking pawl is spaced from the ratchet wheel teeth 30. The locking pawl 26 is pivotal to an engaged condition in which it abuttingly engages the teeth 30 on the ratchet wheels 34 and 36 to hold the seat belt reel 16 against rotational movement in a belt unwinding direction relative to the frame 14.

The locking pawl 26 is moved from the disengaged condition in FIG. 2 toward an engaged condition by a pilot pawl 50. The pilot pawl 50 is pivotally mounted on a pin 52 connected with the frame 14. An inertia weight 54 is tiltable to move the pilot pawl 50 from a disengaged condition shown in FIG. 2 toward an engaged condition in which the nose or leading end portion 56 of the pilot pawl engages teeth 58 disposed in a circular array on a pilot pawl gear 60.

When the belt is being unwound from the reel 16, the reel and pilot pawl gear 60 are rotated in a clockwise direction (as viewed in FIG. 2). Upon movement of the nose or leading end portion 56 of the pilot pawl 50 into engagement with a pilot pawl gear tooth 58 during withdrawal of the belt, the pilot pawl gear tooth continues the pivotal movement of the pilot pawl 50.

The continued movement of the pilot pawl 50 causes it to engage the locking pawl 26 and pivot the locking pawl 26 into engagement with the ratchet wheels 34 and 36. Specifically, an actuator section 64 on the pilot pawl 50 moves upwardly into engagement with the lower portion of the locking pawl 26 to pivot the locking pawl upwardly into engagement with the ratchet wheels 34 and 36. This results in engagement of an end portion 68 of the locking pawl 26 with a trailing flank surface 70 of a respective tooth 30 on each of the rotating ratchet wheels 34 and 36. Continued withdrawal of the safety belt and rotation of the ratchet wheels 34 and 36 moves leading flank surfaces 72 on the teeth 30 into abutting engagement with the end portion 68 of the locking pawl 26. This results in the ratchet wheels 34 and 36 being blocked against rotation in an unwinding direction.

The pilot pawl 50 is moved into engagement with the pilot pawl gear 60 by tilting movement of the inertia member 54. The inertia member 54 has a base 76 which is supported by a housing 78 connected with the section 24 of the frame 14. Upon excessive vehicle deceleration, the inertia member tilts to cam or force the pilot pawl 50 upwardly. The inertia member 54 has a conical surface 79 which engages a tip 80 on the pilot pawl 50. Movement of the inertia member 54 from the position shown in FIG. 2 causes lifting of the pilot pawl into engagement with the a tooth of gear 60.

The pilot pawl gear 60, pilot pawl 50 and inertia weight housing 78 are preferably made of plastic. The frame 14, locking pawl 26 and reel 16 are preferably made of metal.

Connector Assembly

During rotation of the reel 16 and ratchet wheels 34 and 36, the pilot pawl gear 60 rotates with the ratchet wheels until the pilot pawl 50 blocks rotation of the pilot pawl gear. If the locking pawl 26 does not block rotation of the ratchet wheels 34 and 36 after the pilot pawl 50 blocks rotation of the pilot pawl gear 60, relative rotation occurs between the ratchet wheels 34 and 36 and the pilot pawl gear 60. The retractor 10 includes a releasable connector assembly or clutch 82 which accommodates the relative rotation between the the ratchet wheels 34 and 36 and the pilot pawl gear 60. This prevents the application of excessive loads which might cause breaking of the pilot pawl 50 or teeth 58 of the pilot pawl gear 60.

After engagement of the nose or end portion 56 of the pilot pawl 50 with the pilot pawl gear teeth 58, the pilot pawl gear teeth 58 are held against rotation. The ratchet wheels 34 and 36 may continue to rotate as the safety belt continues to be pulled from the retractor 10. The extent of relative rotation between the ratchet wheel teeth 30 and pilot pawl gear teeth 58 may vary under different circumstances. In any event, the relative rotation does result in a change in the angular relationship between the ratchet wheel teeth 30 and the pilot pawl gear teeth 58.

If the angular relationship between the pilot pawl gear teeth 58 and the ratchet wheel teeth 30 changes, a different locking action will occur when the retractor 10 is again actuated to prevent unwinding of the safety belt. Thus, a change in angular relationship of the pilot pawl gear teeth 58 relative to the ratchet wheel teeth 30 will result in the locking pawl 26 engaging the teeth 30 on the ratchet wheels 34 and 36 at different points along the flanks of the teeth upon movement of the locking pawl toward the engaged condition. If the leading end 68 of the locking pawl should happen to engage the crest or nose portion 86 of a ratchet wheel tooth 30 (FIG. 2), the locking pawl could be forced downwardly in such a manner as to prevent immediate engagement of the locking pawl with the ratchet wheel teeth 30. In order to have a consistently repeatable locking action, the locking pawl should engage the ratchet wheel teeth 30 at the same location on the trailing flank surfaces 70 each time the retractor 10 is actuated.

In accordance with a feature of the present invention, the connector assembly 82 is operable to re-establish a predetermined angular relationship between the pilot pawl gear teeth 58 and the ratchet wheel gear teeth 30 after relative rotation therebetween. This enables the same locking action to be consistently obtained each time the retractor 10 is actuated.

To re-establish the predetermined angular relationship between the pilot pawl gear teeth 58 and ratchet wheel teeth 30, the connector assembly 82 effects relative rotation between the pilot pawl gear teeth 58 and ratchet wheel teeth 30 to move the pilot pawl gear teeth and ratchet wheel teeth into their initial angular relationship relative to each other after they have rotated relative to each other. Thus, upon each actuation of the retractor assembly 10, the pilot pawl gear teeth 58 and the ratchet wheel teeth 30 are in the angular relationship shown in FIG. 2. Therefore, the same interaction occurs between the pilot pawl 50 and pilot pawl gear teeth 58 and the locking pawl 26 and ratchet wheel teeth 30 during each subsequent actuation of the retractor 10.

Figure 4:
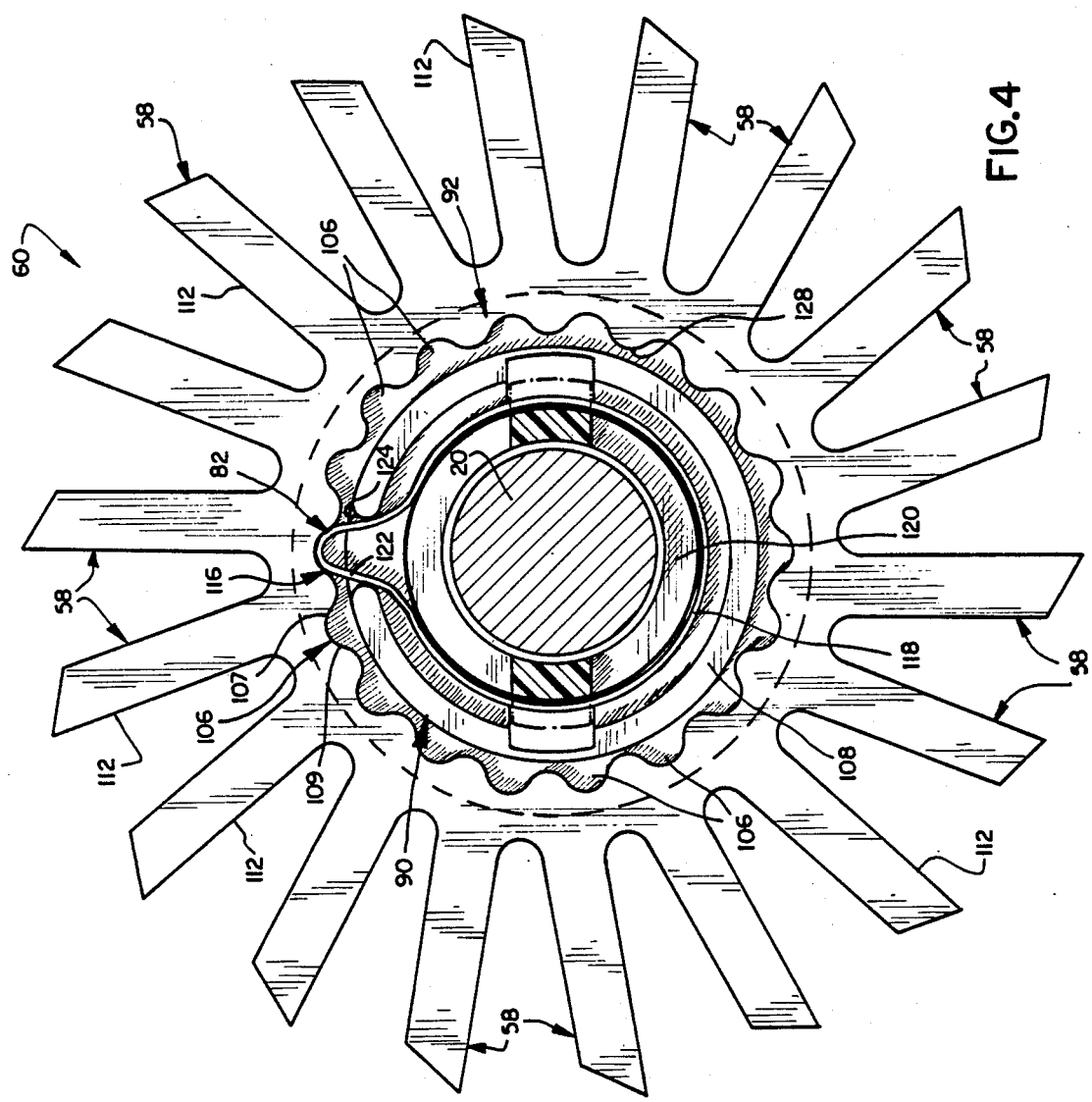
FIG. 4 is a sectional view, taken generally along the line 4—4 of FIG. 3, illustrating the construction of the releasable connector assembly which allows relative rotation to occur between the pilot pawl gear and ratchet wheel and which re-establishes a predetermined angular relationship between the pilot pawl gear and ratchet wheel.
Figure 3:
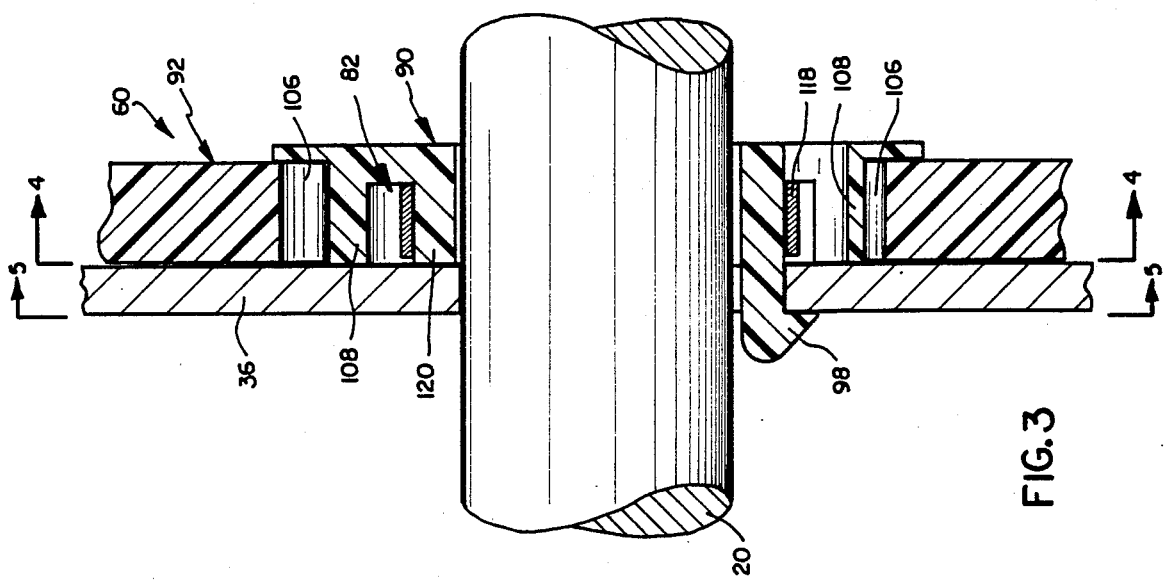
FIG. 3 is an enlarged fragmentary sectional view of the retractor of FIG. 1 further illustrating the relationship between the pilot pawl gear and the ratchet wheel.

The connector assembly 82 is disposed between a hub 90 and a rim section 92 of the pilot pawl gear 60 (see FIGS. 3 and 4). The hub 90 of the pilot pawl gear 60 is fixedly connected with the reel 16. In the illustrated embodiment of the invention, the hub 90 has a pair of retaining lugs 96 and 98 which engage recesses 100 and 102 (FIG. 5) formed in the ratchet wheel 36. The retaining lugs 96 and 98 cooperate with the ratchet wheel 36 to hold the hub 90 of the pilot pawl gear 60 against rotation relative to the ratchet wheel 36.

The annular rim section 92 of the pilot pawl gear 60 is provided with a circular array of arcuate recesses 106 which open radially inwardly toward an annular outer wall 108 of the hub section 90 (FIG. 4). There is one recess 106 associated with each of the pilot pawl gear teeth 58. The number of pilot pawl gear teeth equals the number of teeth on ratchet wheels 34 and 36. Of course, the teeth on the pilot pawl gear 60 are equally spaced, as are the teeth on the ratchet wheels 34 and 36.

Each recess 106 is located in the same orientation relative to an associated pilot pawl gear tooth. Specifically, the center of each recess 106 is disposed along a radial line extending through a leading flank surface 112 of a pilot pawl gear tooth 58.

The rim section 92 of the pilot pawl gear 60, upon which the gear teeth 58 are disposed, is positioned relative to the hub 90 and ratchet wheels 34 and 36 by an indexing element 116 (FIG. 4). In the illustrated embodiment of the invention, the indexing elements 116 is a metal spring having a circular retaining section 118 which grips the outer side surface of an annular inner wall 120 of the hub 90 and holds the indexing element 116 against rotational movement relative to the hub 90. The metal spring has a nose or indexing section 122 which extends outwardly from the retaining section 118 through an opening 124 in the annular outer wall 108 of the hub 90 into engagement with one of the recesses 106.

Since each of the recesses 106 is located in the same orientation relative to a pilot pawl gear tooth 58, engagement of the indexing section 122 of the indexing element 116 with any one of the recesses will position the pilot pawl gear teeth 58 in the same angular orientation relative to the hub 90. The hub 90 is fixedly connected with the ratchet wheel 36. Therefore, the indexing element 116 can engage any one of the recesses 106 to position the pilot pawl gear teeth 58 in the same orientation relative to the teeth 30 on the ratchet wheel 36. Of course, the teeth 30 on the ratchet wheel 34 are aligned with the teeth 30 on the ratchet wheel 36 so that the indexing element 116 cooperates with the recesses 106 to position the pilot pawl gear teeth 58 relative to the teeth 30 on both of the ratchet wheels 34 and 36.

Operation

Upon the occurrence of excessive vehicle deceleration in an emergency situation, the body of an occupant of the vehicle will pull on the safety belt to effect rotation of the pilot pawl gear 60 and ratchet wheel 36 in a clockwise direction as viewed in FIG. 2. The inertia member 54 is tilted to cause the pilot pawl 50 to pivot in a counterclockwise direction around the pin 52 to engage one of the rotating pilot pawl gear teeth 58. The pilot pawl gear 60 then continues the pivotal movement of the pilot pawl 50 to move the locking pawl 26 into abutting engagement with the trailing flank 70 of a tooth 30 on the ratchet wheel 34 and with the trailing flank 70 of a tooth 30 on the ratchet wheel 36.

The pilot pawl 50 will then block the pilot pawl teeth 58 against further rotation relative to the frame 14 of the retractor assembly 10. However, since the locking pawl 26 is not yet blocked movement of the ratchet wheels 34 and 36, the ratchet wheels will continue to rotate. Since the hub section 90 of the pilot pawl gear 60 is fixedly connected with the ratchet wheel 36, the hub section will continue to rotate with the ratchet wheel 36. Therefore, the hub section 90 and ratchet wheels 34 and 36 will rotate relative to the stationary rim section 92 of the pilot pawl gear 60.

The relative rotation between the hub 90 and rim section 92 results in the indexing spring element 116 being compressed radially inwardly and moved along inner side surface 128 of the rim section 92 from one recess to a next adjacent recess or the like, depending upon the amount of relative rotation of the hub 90 and rim 92 of the pilot pawl gear. Thus, as viewed in FIG. 4, the hub 90 and indexing element 116 will rotate in a counterclockwise direction relative to the stationary rim section 92 of the pilot pawl gear 60. This could result in the indexing element 116 moving in a counterclockwise direction out of engagement with one recess 106 and into engagement with a next adjacent recess.

Since each of the recesses 106 is in the same position relative to a tooth 58 on the pilot pawl gear 60 and since the pilot pawl gear has the same number of teeth as the ratchet wheels 36 and 38, the angular relationship between the teeth 58 on the pilot pawl gear 60 and the teeth 30 on the ratchet wheels 34 and 36 is the same regardless of which recess 106 is engaged by the indexing element 116. Thus, as the indexing element 116 moves in a counterclockwise direction from engagement with one recess into engagement with the next recess, the angular relationship between the teeth 58 on the pilot pawl gear and the teeth 30 on the ratchet wheels 34 and 36 changes. However, once the indexing element 116 is in aligned engagement with the next succeeding recess 106, the initial angular relationship between the teeth 58 of the pilot pawl gear 60 and the teeth 30 of the ratchet wheels 34 and 36 is re-established. Thus, each tooth 30 on the ratchet wheels 34 and 36 will have shifted by one tooth spacing or the like relative to the pilot pawl gear. However, the angular relationship between the ratchet wheel teeth 30 and the pilot pawl gear teeth 58 will be the same as the angular relationship between the ratchet wheel teeth and pilot pawl gear teeth before actuation of the retractor 10.

In the illustrated embodiment of the invention, the ratchet wheels 34 and 36 have 18 teeth. The pilot pawl gear 60 also has 18 teeth. Prior to actuation of the retractor 10 to lock the safety belt against withdrawal from the retractor assembly, the leading flank surfaces 112 on the pilot pawl gear teeth 58 are disposed on radial planes which are approximately midway between radial planes extending through the leading flank surfaces 72 of the ratchet wheel gear teeth 30 (see FIG. 2).

Upon movement of the pilot pawl 50 out of engagement with the pilot pawl gear teeth 58, the initial angular orientation between the pilot pawl gear teeth 58 and ratchet wheel teeth 30 will be re-established by the indexing element 116. The indexing element 116 will have shifted from a centered relationship with one recess 106 to a centered relationship with a next adjacent recess. The hub 90 of the pilot pawl gear 60 will have shifted through 20 degrees relative to the rim 92 of the pilot pawl gear.

It should be understood that the foregoing recitation of specific numbers of pilot pawl gear teeth 58 and ratchet wheel teeth 30 has been for purposes of clarity of description. It is contemplated that the number of teeth on the pilot pawl gear 60 and ratchet wheels 34 and 36 could be different than the specific number of teeth set forth above.

Since the indexing element 116 is formed by a resilient spring, the indexing element cooperates with the sides of the recesses 106 to accurately position the pilot pawl gear teeth 58 relative to the ratchet wheel teeth 30 when the relative rotation between the hub and rim sections 90 and 92 is slightly more or less than the spacing between pilot pawl gear teeth. Thus, if indexing element 116 moves only into partial alignment with a next succeeding recess 106, the indexing element will be resiliently compressed by a side surface of the next succeeding recess. This potential energy will result in the rim section 92 of the pilot pawl gear 60 being shifted slightly relative to the hub 90 of the pilot pawl gear to obtain the aligned engagement shown in FIG. 4 between the indexing element 116 and the next succeeding recess 106. This results in re-establishment of the initial angular relationship between the pilot pawl gear teeth 58 and the ratchet wheel teeth 30.

If the relative rotation between the hub 90 and rim section 92 of the pilot pawl gear 60 is less than the angular distance between the leading flank surfaces 112 on adjacent pilot pawl gear teeth 58, that is, less than 20 degrees, the indexing element 116 will be resiliently compressed against a side surface 107 on the next adjacent recess 106. The force applied against the side surface 107 of the recess 106 by the indexing element 116 will cause a slight reverse or clockwise rotation (as viewed in FIG. 4) of the rim section 92 to center the indexing element 116 in the next succeeding recess 106. This slight reverse rotation will not be sufficient to cause disengagement of the pilot pawl 50 from the pilot pawl gear teeth 58.

If the relative rotation between the hub 90 and rim section 92 of the pilot pawl gear 60 is greater than the angular distance between the leading flank surfaces 112 or adjacent pilot pawl gear teeth 58, that is, more than 20 degrees, the indexing element 116 will be compressed against a side surface 109 on the next adjacent recess 106. The force applied against the side surface 109 of the recess 106 by the indexing element 116 will cause a slight forward or counterclockwise rotation (as viewed in FIG. 4) of the rim section 92 as the pilot pawl 50 is disengaged from the pilot pawl gear 60. This slight forward rotation results in a centering of the indexing element 116 in the next succeeding recess 106.

Second Embodiment of the Invention

In the embodiment of the invention shown in FIGS. 1–5, the indexing element 116 is formed separately from the hub 90 and rim section 92 of the pilot pawl gear 60 and is fixedly connected with the hub 90. In the embodiment of the invention shown in FIGS. 6 and 7, the indexing element and rim section of the pilot pawl gear are formed as one piece. Since the embodiment of the invention shown in FIGS. 6 and 7 is generally similar to the embodiment of the invention shown in FIGS. 1–5, similar numerals will be utilized to designate similar components, the suffix letter "a" being associated with the numerals of the embodiment of the invention shown in FIGS. 6 and 7 to avoid confusion.

In the embodiment of FIGS. 6 and 7, the hub section 90a of a pilot pawl gear 60a is connected with a ratchet wheel 36a by a pair of lugs 98a. Only one of the lugs 98a is shown in FIG. 6. The rim section 92a of the pilot pawl gear 60a is connected with the hub 90a by a releasable connector assembly or clutch 82a which allows relative rotation to occur between the pilot pawl gear teeth 58a and teeth on the ratchet wheel 36a upon engagement of a pilot pawl with the pilot pawl gear teeth 58a. The connector assembly 82a re-establishes the initial angular relationship between the teeth 58a on the pilot pawl gear 60a and the teeth on the ratchet wheel 36a.

The connector assembly 82a includes a circular array of recesses 106a formed in the hub 90a. A plurality of indexing elements 116a are formed as one piece with the rim section 92a of the pilot pawl gear 60a and engage the recesses 106a. When the positioning elements 116a are in aligned engagement with recesses 106a, each recess is positioned in the same relationship relative to an associated pilot pawl gear tooth 58a. Thus, a crest or peak 132 between a pair of adjacent recesses 106a is disposed on a radial plane containing a leading flank surface 112a for a pilot gear tooth 58a.

Upon engagement of the pilot pawl with the pilot pawl gear teeth 58a to block rotation of the rim section 92a, the hub 90a and ratchet wheel 36a continue to rotate. Continued rotation of the hub 90a causes indexing elements 116a to be cammed or forced radially outwardly, in the manner shown in dashed lines in FIG. 7, to move into engagement with next succeeding recesses 106a. As the hub 90a rotates relative to the rim section 92a, connector sections or strips 136 are resiliently deflected radially outwardly in the manner shown in dashed lines in FIG. 7. As the relative rotation between the hub section 90a and rim section 92a continues, the resiliently deflected connector sections 136 move the indexing element 116a into engagement with the next adjacent recess 106a.

The resilient spring action of the deflected connector sections 136 causes the indexing elements 116a to move into aligned engagement with the recesses 106a. Therefore, the initial angular relationship between the pilot pawl gear teeth 58a and teeth on the ratchet wheel 36a is re-established after relative rotation occurs between the hub 90a and rim section 92a of the pilot pawl gear 60a. The connector sections 136 are advantageously molded as one piece with the rim section 92a. The connector sections 136 are partially defined by slots 137 extending through the rim section 92a.

In the embodiments of the invention illustrated herein, the releasable connector assembly 82 or 82a which re-establishes the initial angular relationship between the pilot pawl gear teeth 58 or 58a and ratchet wheel teeth 30 is located between the hub 90 and rim section 92 or hub 90a and rim section 92a of the pilot pawl gear. However, it is contemplated that the connector assembly could be located between other elements of the retractor 10 if desired.

Summary

The present invention provides a seat belt retractor 10 having a consistent locking action. The retractor 10 includes a locking pawl 26 which is moved into engagement with teeth 30 on a ratchet wheel 36 by a pilot pawl 50 upon engagement of the pilot pawl with a pilot pawl gear 60. A releasable connector assembly or clutch 82 allows relative rotation to occur between the ratchet wheel 36 and pilot pawl gear 60 to prevent excessive loads from being applied to the pilot pawl gear teeth and pilot pawl. This results in a change in the angular relationship between the teeth 30 on the ratchet wheel 36 and the teeth 58 on the pilot pawl gear 60. In order to provide a consistent locking action upon repeated actuation of the retractor, the connector assembly 82 re-establishes a predetermined angular relationship between the teeth on the ratchet wheel 36 and pilot pawl gear 60 after the relative rotation therebetween.

Having described specific preferred embodiments of the invention, the following is claimed:

1. A safety belt retractor comprising a rotatable element around which a safety belt may be wound, a ratchet wheel fixedly connected with said rotatable element and having a plurality of teeth disposed in an annular array, a locking pawl movable between a disengaged condition spaced from said ratchet wheel and an engaged condition engaging the teeth on said ratchet wheel to hold said rotatable element against rotation, a pilot pawl gear having a plurality of teeth disposed in an annular array, said teeth on said pilot pawl gear being disposed in a predetermined angular orientation relative to said teeth on said ratchet wheel, a pilot pawl movable between a disengaged condition spaced from said pilot pawl gear and an engaged condition engaging teeth on said pilot pawl gear, means for effecting movement of said locking pawl from the disengaged condition toward the engaged condition upon movement of said pilot pawl from the disengaged condition to the engaged condition, and connector means connected with said ratchet wheel and pilot pawl gear for allowing relative rotation to occur between said ratchet wheel and pilot pawl gear with a corresponding change in the angular relationship between the teeth on said ratchet wheel and the teeth on said pilot pawl gear upon movement of said pilot pawl to the engaged condition during rotation of said rotatable element, said connector means including means for re-establishing the predetermined angular relationship between the teeth on said ratchet wheel and the teeth on said pilot pawl gear after relative rotation between said ratchet wheel and pilot pawl gear has ceased.

2. A retractor as set forth in claim 1 wherein said pilot pawl gear includes a hub section connected with said ratchet wheel for rotation therewith and a rim section upon which the annular array of pilot pawl gear teeth is disposed, said hub and rim sections of said pilot pawl gear being interconnected by said connector means.

3. A retractor as set forth in claim 2 wherein said means for re-establishing the predetermined angular relationship between the teeth on said ratchet wheel and the teeth on said pilot pawl gear includes resilient means for effecting relative rotation between said hub and rim sections of said pilot pawl gear.

4. A retractor as set forth in claim 1 wherein said means for re-establishing the predetermined angular relationship between the teeth on said ratchet wheel and pilot pawl gear includes means for effecting relative rotation between said ratchet wheel and pilot pawl gear in either a first direction or a second direction depending upon the extent of the change in the angular relationship between the teeth on said ratchet wheel and the teeth on said pilot pawl gear.

5. A retractor assembly as set forth in claim 1 wherein said means for re-establishing the predetermined relationship between the teeth on said ratchet wheel and pilot pawl gear includes a surface on said pilot pawl gear and resilient means for applying force against said surface to rotate the teeth on said pilot pawl gear relative to the teeth on said ratchet wheel.

6. A retractor assembly as set forth in claim 1 wherein said pilot pawl gear includes a hub section connected with said ratchet wheel and a rim section upon which the array of pilot pawl gear teeth is disposed, said means for re-establishing the predetermined relationship between the teeth on said ratchet wheel and pilot pawl gear including an array of recesses disposed on one of said sections of said pilot pawl gear and an indexing element disposed on the other of said sections of said pilot pawl gear, said indexing element being disposed in engagement with a first one of said recesses when the teeth on said ratchet wheel and pilot pawl gear are in the predetermined angular relationship, said hub and rim sections of said pilot pawl gear being relatively rotatable to move the first recess and said indexing element out of engagement and to move a second one of said recesses and said indexing element into engagement upon movement of said pilot pawl to the engaged position.

7. A retractor assembly as set forth in claim 6 wherein said indexing element includes a resiliently deflectable spring member, at least a portion of said spring member being engageable with and resiliently deflectable relative to said recesses.

8. A retractor assembly as set forth in claim 7 wherein at least a portion of said spring member is fixedly connected with one of said sections of said pilot pawl gear.

9. A retractor as set forth in claim 1 wherein said pilot pawl gear includes a hub section connected with said ratchet wheel for rotation therewith and a rim section upon which the annular array of pilot pawl gear teeth is disposed, said hub and rim sections of said pilot pawl gear being interconnected by said connector mean, said means for re-establishing the predetermined angular relationship between the teeth on said ratchet wheel and pilot pawl gear includes resilient means having projecting portions on one of said sections of said pilot pawl gear, said projecting portions cooperating with portions of the other of said sections of said pilot pawl gear to re-establish said predetermined angular relationships.

10. A retractor as defined in claim 9 wherein said one section of said pilot pawl gear has slots therethrough which which partially define strips of material which form said resilient means and can move radially relative to said one section of said pilot pawl gear, said projecting portions being disposed on said strips of material.

* * * * *